United States Patent
Kusuda

(10) Patent No.: US 10,222,144 B2
(45) Date of Patent: Mar. 5, 2019

(54) METHODS AND APPARATUS FOR A MICROTRUSS HEAT EXCHANGER

(71) Applicant: The Boeing Company, Huntington Beach, CA (US)

(72) Inventor: Charles E. Kusuda, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 459 days.

(21) Appl. No.: 14/493,930

(22) Filed: Sep. 23, 2014

(65) Prior Publication Data
US 2016/0084578 A1    Mar. 24, 2016

(51) Int. Cl.
  *F28F 13/00*   (2006.01)
  *F28D 15/04*   (2006.01)
  *B23P 15/26*   (2006.01)

(52) U.S. Cl.
  CPC .......... *F28F 13/003* (2013.01); *F28D 15/046* (2013.01); *B23P 15/26* (2013.01); *F28F 2260/00* (2013.01)

(58) Field of Classification Search
  CPC ............... F28F 2260/00; F28F 2260/02; F28F 2210/02; F28F 13/003
  See application file for complete search history.

(56) References Cited

U.S. PATENT DOCUMENTS

| 5,423,498 | A | 6/1995 | Fluegel |
| 5,842,666 | A | 12/1998 | Gerhardt et al. |
| 6,612,523 | B2 | 9/2003 | Gardner |
| 7,401,643 | B2 | 7/2008 | Queheillalt et al. |
| 8,573,289 | B1 | 11/2013 | Roper et al. |
| 2002/0170941 | A1 | 11/2002 | Wallach et al. |
| 2004/0123980 | A1 | 7/2004 | Queheillalt et al. |
| 2004/0154252 | A1 | 8/2004 | Sypeck et al. |
| 2010/0236759 | A1* | 9/2010 | Wadley ............ E04C 2/34 165/104.19 |
| 2010/0300669 | A1 | 12/2010 | Jacobsen et al. |
| 2011/0186263 | A1 | 8/2011 | Piesker |

(Continued)

FOREIGN PATENT DOCUMENTS

| EP | 0 646 719 B1 | 3/1998 |
| WO | 2008131105 A1 | 10/2008 |

OTHER PUBLICATIONS

Sugimura, Mechanical response of single layer tetrahedral trusses under shear loading, 2004.*

(Continued)

*Primary Examiner* — Eric Ruppert
(74) *Attorney, Agent, or Firm* — Armstrong Teasdale LLP

(57) ABSTRACT

A microtruss structure includes a first plane having a first plurality of unit cells. Each of the first plurality of unit cells includes a first plurality of struts and a first node connecting three or fewer struts of the first plurality of struts such that each strut of the first plurality of struts extends through the first node. The microtruss structure also includes a second plane having a second plurality of unit cells. Each of the second plurality of unit cells includes a second plurality of struts and a second node connecting three or fewer struts of the second plurality of struts such that each strut of the second plurality of struts extends through the second node.

21 Claims, 10 Drawing Sheets

(56) References Cited

U.S. PATENT DOCUMENTS

2013/0143060 A1    6/2013  Jacobsen et al.

OTHER PUBLICATIONS

Gervasi, MSOE TetraLattice, Aug. 1999.*
Maloney, Multifunctional heat exchangers derived from three-dimensional micro lattice structures, Jan. 2012.*
Schaedler, T.A., et al., "Heat Transfer Performance of a Cold Plate with Micro-Architected Lattice Core," 5 pages.
Roper, Christopher S., et al., "Anisotropic Convective Heat Transfer in Microlattice Materials," AIChE Journal vol. 00, No. 0, 2012, 8 pages.
Wadley Research Group—UVA, "Thermal Management," Apr. 24, 2013, 9 pages.

* cited by examiner

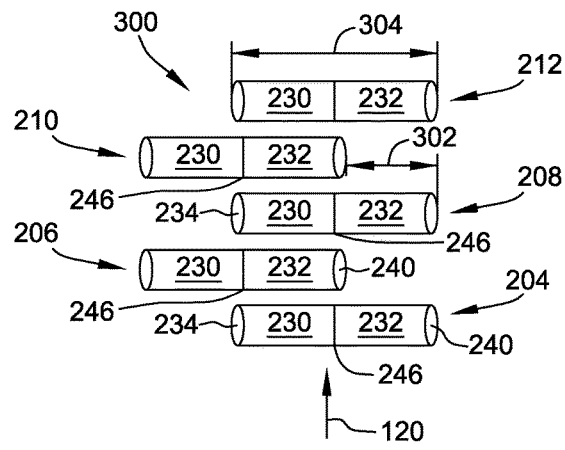
FIG. 7
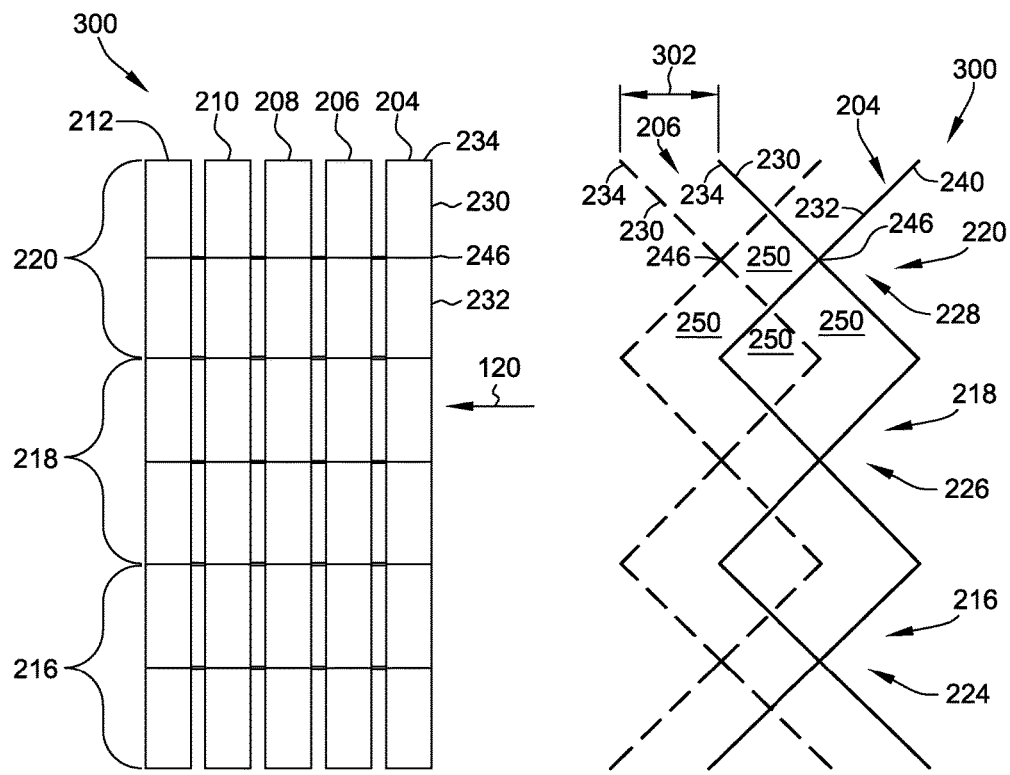
FIG. 8
FIG. 6

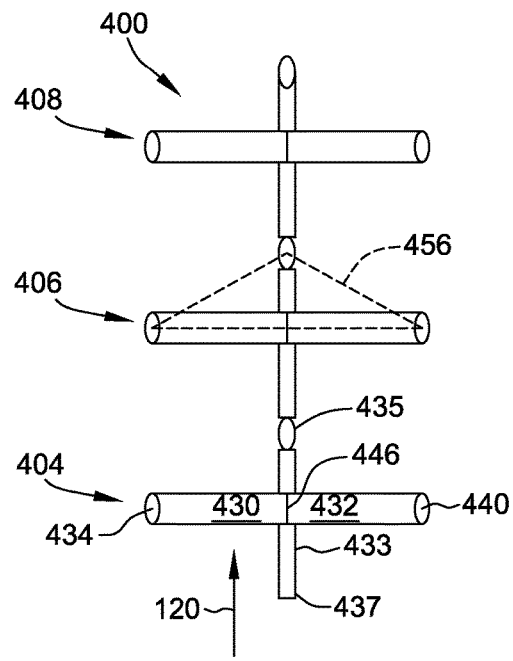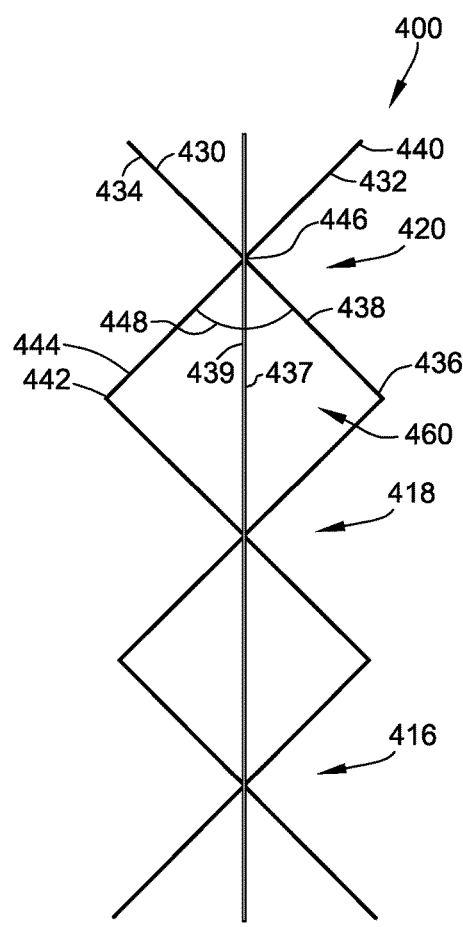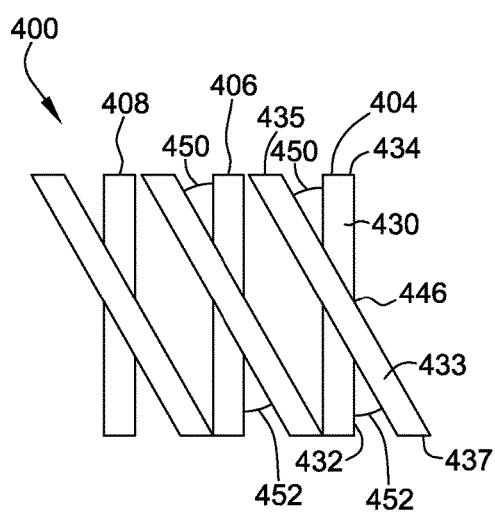
FIG. 11
FIG. 12
FIG. 10

METHODS AND APPARATUS FOR A MICROTRUSS HEAT EXCHANGER

BACKGROUND

The field of the invention relates generally to cooling of structures, and more specifically, to methods and apparatus for a micro-truss based structural insulation layer.

There are at least two known types of cross-flow heat exchangers: a plate-and-fin heat exchanger and a microtruss heat exchanger. The plate-and-fin heat exchangers include metal plates having fins extending between adjacent plates. Hot and cold fluids flow past the fins between the plates, losing and gaining heat by convection, and the fins conduct heat to or from the plates. If the fluid has particulates entrained in its flow, the particulates may become lodged between the fins and clog the heat exchanger. Further, the plate-and-fin heat exchange relies on transferred heat to and from the plates. The microtruss heat exchanger includes struts that intersect at nodes. A fluid flows past the struts and nodes. When the struts are solid, heat is transferred between the fluid and the struts. When the struts are hollow, a second fluid flows through the struts, and heat is transferred between the struts and the second fluid to heat or cool the first fluid. As such, one purpose of a heat exchanger is to exchange heat between two fluids. However, another purpose may be to cool, heat, and/or insulate a structure to which the heat exchanger is mounted.

Known microtruss heat exchangers include four struts (4-fold) or more struts intersecting at each node, providing more strut surfaces for the first fluid to interact with. Further, the 4-fold truss structure may allow the heat exchanger to be load bearing if a component surrounding the heat exchanger fails. However, the density of struts in 4-fold microtruss structure is so high that upstream struts may reduce the first fluid from flowing past the leading edges of the downstream struts, and therefore reduce their heat transfer the operational efficiency of the heat exchanger. For example, a leading edge of a downstream strut is covered by a trailing edge of an upstream strut, causing the downstream strut to have less exposed area for heat transfer. As such, heat transfer at the downstream struts is reduced as compared to heat transfer at the upstream struts, which are not blocked from interacting with a cooling flow.

BRIEF DESCRIPTION

In one aspect, a microtruss structure for use in a heat exchanger is provided. The microtruss structure includes a first plane having a first plurality of unit cells. Each of the first plurality of unit cells includes a first plurality of struts and a first node connecting three or fewer struts of the first plurality of struts such that each strut of the first plurality of struts extends through the first node. The microtruss structure also includes a second plane having a second plurality of unit cells. Each of the second plurality of unit cells includes a second plurality of struts and a second node connecting three or fewer struts of the second plurality of struts such that each strut of the second plurality of struts extends through the second node.

In another aspect, a heat exchanger is provided. The heat exchanger includes a manifold having a first skin layer and a second skin layer positioned a predetermined distance apart such that an interior portion is defined therebetween. The heat exchanger also includes a microtruss structure extending within the interior portion and coupled to the first and the second skin layers. The microtruss structure includes a first plane having a first plurality of unit cells. Each of the first plurality of unit cells includes a first plurality of struts and a first node connecting three or fewer struts of the first plurality of struts such that each strut of the first plurality of struts extends through the first node. The microtruss structure also includes a second plane having a second plurality of unit cells. Each of the second plurality of unit cells includes a second plurality of struts and a second node connecting three or fewer struts of the second plurality of struts such that each strut of the second plurality of struts extends through the second node.

In still another aspect, a method of manufacturing a heat exchanger is provided. The method includes forming a microtruss structure including a first plane comprising a first plurality of unit cells, wherein each of the first plurality of unit cells comprises a first plurality of struts and a first node connecting three or fewer struts of the first plurality of struts such that each strut of the first plurality of struts extends through the first node. Forming a microtruss structure further includes forming a microtruss structure including a second plane comprising a second plurality of unit cells, wherein each of the second plurality of unit cells comprises a second plurality of struts and a second node connecting three or fewer struts of the second plurality of struts such that each strut of the second plurality of struts extends through the second node. The method further comprising coupling the microtruss structure within an interior portion of a manifold between a first skin layer and a second skin layer.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

FIG. 6 is a front view of the microtruss structure shown in FIG. 5.

FIG. 7 is a top view of the microtruss structure shown in FIG. 5.

FIG. 8 is a side view of the microtruss structure shown in FIG. 5.

FIG. 10 is a front view of the microtruss structure shown in FIG. 9.

FIG. 11 is a top view of the microtruss structure shown in FIG. 9.

FIG. 12 is a side view of the microtruss structure shown in FIG. 9.

DETAILED DESCRIPTION

The described embodiments relate to a heat exchanger element having a microtruss structure therein. In various embodiments, the microtruss structure includes a plurality of struts intersecting at a node to define a unit cell. An overall structure of the heat exchanger may include pluralities of planes of 2-fold microtruss structures aligned with or offset from each other and/or pluralities of planes of 3-fold microtruss structures aligned with or offset from each other. As compared to more conventional 4-fold microtruss structures, 2-fold and 3-fold structures are generally less dense and, therefore, allow for a greater amount of heat transfer per unit cell. Moreover, the open areas between struts of 2-fold and 3-fold microtruss structures are larger and allows for more foreign object debris entrained within a cooling flow to pass through without becoming lodged in the struts.

Figure 1:
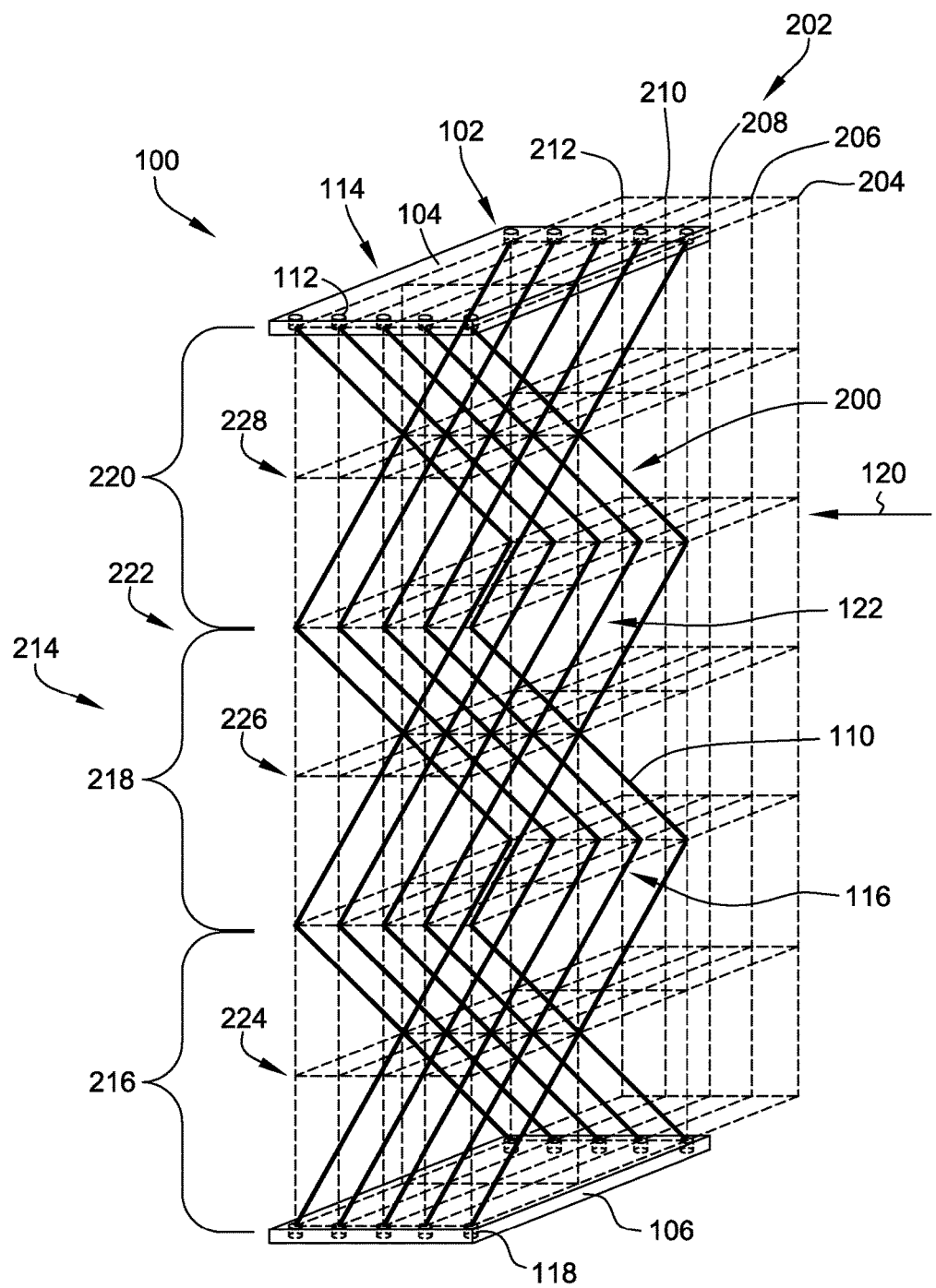
FIG. 1 is a perspective view of an exemplary heat exchanger having an exemplary 2-fold microtruss structure with a plurality of aligned planes.

FIG. 1 is a perspective view of a cross flow heat exchanger 100 including a manifold 102 having an inlet skin layer 104 and an outlet skin layer 106. Heat exchanger 100 also includes a microtruss structure 200 having a plurality of struts 110 that extends between layers 104 and 106. In the exemplary implementation, inlet skin layer 104 includes a plurality of inlet openings 112 that allow fluid from a hot fluid stream 114 to flow therethrough and into an interior 116 of heat exchanger 100. Similarly, outlet skin layer 106 includes a plurality of outlet openings 118 that allow fluid flow from interior 116 to be discharged therethrough. A fluid from a cooling fluid stream 120 enters interior 116 of heat exchanger 100 in a direction that is substantially perpendicular to fluid stream 114 and flows through a plurality of open areas 122 defined in microtruss 200 between struts 110 to facilitate cooling microtruss 200 and fluid stream 114. As such, one purpose of heat exchanger 100 is to exchange heat between two fluids, streams 114 and 120. However, another purpose may be to cool, heat, and/or insulate a structure (not shown) to which heat exchanger 100 is mounted.

In the exemplary implementation, struts 110 are thin-walled hollow structures, the ends of which are aligned with openings 112 and 118 such that hot fluid from stream 114 enters the heat exchanger 100 through openings 112, is channeled through struts 110, and is discharged from the heat exchanger through the opening 118. Alternatively, struts 110 are substantially solid and conduct heat between streams 114 and 120 in a manner similar to a skin heat exchanger. In embodiments where struts 110 are hollow, as cooling fluid from stream 120 flows through open areas 122 between struts 110 of microtruss 200, heat is conducted through the walls of struts 110 such that heat is transferred from hot fluid 114 to cooling fluid 120. In one embodiment, the walls of hollow struts 110 have a thickness that is within a range of between approximately 0.003 inches (in.) (0.076 millimeters (mm)) and approximately 0.01 in. (0.254 mm). Alternatively, the walls of struts 110 may have any thickness that facilitates operation of heat exchanger 100 as described herein. The temperature of cooling fluid 120 directed through microtruss 200 will increase as cooling fluid 120 removes heat from struts 110. Correspondingly, the temperature of hot fluid 114 directed through microtruss 200 will decrease as cooling fluid 120 removes heat from struts 110. The high surface area to volume ratio of microtruss structure 200 provides increased heat exchange from hot fluid 114 to cooling fluid 120, as described in further detail below.

In the exemplary implementation, microtruss 200 is fabricated from at least one of a ceramic material, a metal, a metal alloy, and a polymer material. Alternatively, microtruss 200 may be fabricated from any material that facilitates operation of heat exchanger 100 as described herein. One preferred implementation of heat exchanger 100 utilizes a ceramic microtruss 200. Silicon carbide and alumina are two examples of such a ceramic material, although others may be utilized. Ceramic materials are generally less dense than metals and ceramic materials are generally more thermally stable in higher temperature environments. Additionally, ceramic materials generally have a lower thermal conductivity, which inhibits the conduction of heat through struts 110 to a surface requiring protection from hot fluid stream 114.

Furthermore, microtruss 200 may be fabricated using any number of methods. In the exemplary implementation, tiers of microtruss 200 are formed from a polymer material using an additive manufacturing process. The tiers are then coupled together to form a complete scaffold of microtruss 200. The scaffold is then plated with a plating material to form struts 110. In one embodiment, the plating material is metallic, but may be any material that facilitates operation of heat exchanger 100, as described above. The polymer scaffold is substantially solid when formed to withstand the plating process. Once plated, the polymer scaffold is treated using a chemical or heat treatment to dissolve the scaffold, leaving hollow struts 110 comprised of the plating material. In another implementation, hollow struts 110 of microtruss 200 may be fabricated directly using an additive manufacturing or direct laser metal sintering (DMLS) process without requiring fabrication of a scaffold for plating. Direct additive manufacturing and DMLS eliminate the plating process and enable additional surface features, such as, but not limited to transpiration openings or fins, to be formed on struts 110 for enhanced heat transfer ability. Additionally, additive manufacturing and DMLS provide a user with more control over the consistency of the cross-sectional shape and the wall thickness of struts 110 than other known methods, such as collimated optical light beams.

Figure 3:
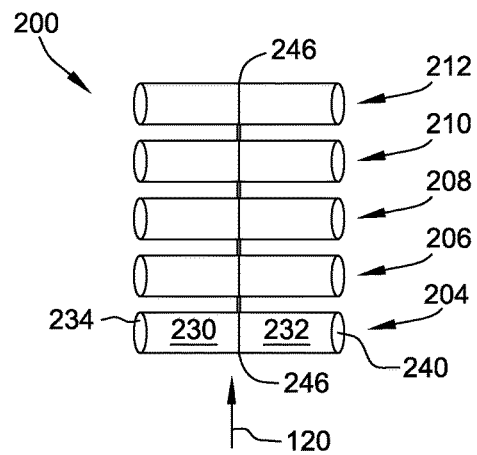
FIG. 3 is a top view of the microtruss structure shown in FIG. 1.
Figure 4:
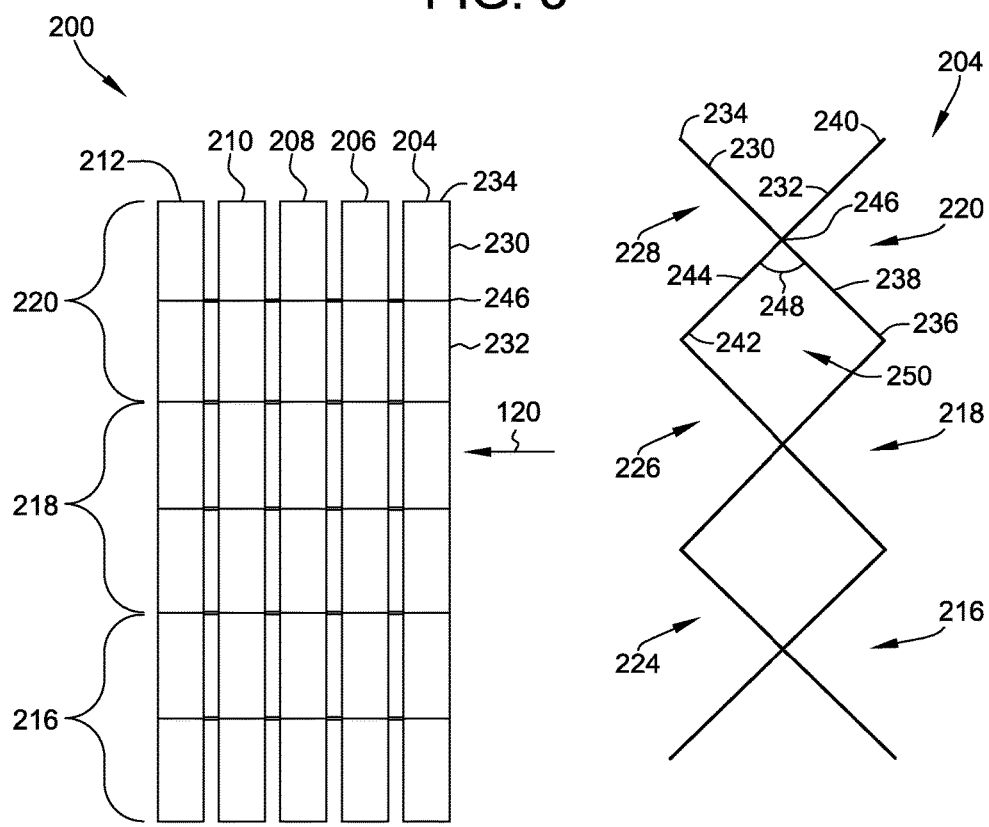
FIG. 4 is a side view of the microtruss structure shown in FIG. 1.
Figure 2:
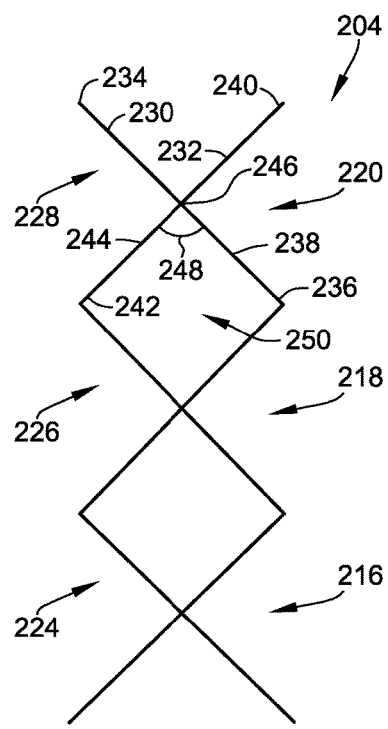
FIG. 2 is a front view of the microtruss structure shown in FIG. 1.

Further in regards to FIG. 1, heat exchanger 100 includes an exemplary 2-fold microtruss 200 having a plurality of aligned planes 202. FIG. 2 is a front view of microtruss 200. FIG. 3 is a top view of microtruss 200. FIG. 4 is a side view of microtruss 200. Although described herein as used in cross flow heat exchanger 100, microtruss 200 may also be used in a surface heat exchanger. As shown in FIG. 1, microtruss 200 includes a plurality of planes 202 including a first plane 204, a second plane 206, a third plane 208, a fourth plane 210, and a fifth plane 212 that are vertically oriented and arranged sequentially in a direction of cooling fluid stream 120 such that stream 120 initially encounters first plane 204. Each plane 202 includes a plurality of tiers 214. Shown in FIG. 1 are first tier 216, second tier 218, and third tier 220. Although only five planes 202 and three tiers 214 are shown, it is contemplated that microtruss 200 may have any number of planes 202 and tiers 214 to facilitate operation of heat exchanger 100 as described herein.

In the exemplary implementation, planes 202 and tiers 214 of microtruss 200 include a plurality of ordered unit cells 222 that form repeating patterns within microtruss 200. More specifically, each tier 214 includes a height of a single unit cell 222 such that first tier 216 includes a plurality of first unit cells 224, second tier 218 includes a plurality of second unit cells 226, and third tier 220 includes a plurality of third unit cells 228.

As shown in FIGS. 1-4, microtruss 200 is a 2-fold microtruss structure, indicating that each unit cell 222 of microtruss 200 includes only two angled struts including a first strut 230 and a second strut 232. Struts 230 and 232 are substantially similar to struts 110, shown in FIG. 1, in form and operation and may also be referred to as "truss elements," "truss members," or "polymer waveguides". As best shown in FIG. 2, first strut 230 includes a first end 234, a second end 236, and a body 238 extending therebetween. Similarly, second strut 232 includes a first end 240, a second end 242, and a body 244 extending therebetween. In the exemplary implementation, body portions 238 and 244 of each strut 230 and 232 intersect each other at their respective midpoints to define a node 246. The node may be implemented using, for example, a 4-way cross pipe fitting. Alternatively, struts 230 and 232 may interest each other at any point along body portions 238 and 244 that facilitates operation of heat exchanger 100 (shown in FIG. 1) as described herein. Each node 246 includes a cross-sectional area that is equal to the sum of the cross sectional areas of struts 230 and 232 such that a pressure and velocity of hot fluid stream 114 (shown in FIG. 1) within struts 230 and 232 remains substantially constant within interior 116 (shown in FIG. 1) of heat exchanger 100.

Struts 230 and 232 are shaped substantially similarly to each other, and, as best shown in FIG. 3, include a substantially elliptical cross-sectional profile having a major axis aligned in the direction of cooling fluid stream 120. An elliptical cross-sectional profile aligned as such provides an increased amount of heat transfer along the sides of struts 230 and 232 for a transfer of heat from internal stream 114 while presenting only a small profile, equal to a length of a minor axis, to external cooling fluid stream 120 to minimize a pressure drop caused by impingement of cooling fluid stream 120 on struts 230 and 232. In one embodiment, the major axis of each strut 230 and 232 is within a range of between approximately 1 millimeter (mm) (0.039 inches (in.)) and approximately 4 mm (0.157 in.) and the minor axis is within a range of between approximately 0.25 mm (0.009 in.) and approximately 1 mm (0.039 in.). Alternatively, the major and minor axes of struts 230 and 232 may be any length that facilitates operation of heat exchanger 100 as described herein. Similarly, a ratio of the length of the major axis compared to the minor axis is one of 4-1 or 5-1. Alternatively, the length ratio of the major and minor axes of struts 230 and 232 may be any ratio that facilitates operation of heat exchanger 100 as described herein.

In other embodiments, the cross-sectional profile of each strut 230 and 232 is shaped as one of a teardrop, circle, or airfoil, that is, the cross-sectional profile of a wing, propeller, rotor, or turbine. Moreover, first ends 234 and 240 of struts 230 and 232, respectively, may have different cross-sectional shapes and/or cross-sectional areas than second ends 236 and 242 of respective struts 230 and 232 such that the cross-sectional shape and/or cross-sectional area of each strut 230 and 232 changes along respective body portions 238 and 244. Such an embodiment is particularly useful when heat exchanger 100 is used as a condenser such that first ends 234 and 240 have larger cross-sectional areas than second ends 236 and 242 to reduce the pressure drop through struts 230 and 232. Furthermore, differing cross-sectional shapes and/or cross-sectional areas of the opposing ends of struts 230 and 232 tailors the interior of struts 230 and 232 to the density of at least one of streams 114 and 120 such that a consistent velocity is maintained between plates 104 and 106 (shown in FIG. 1). Moreover, differing cross-sectional shapes and/or cross-sectional areas of the opposing ends of struts 230 and 232 has the added benefit of receding liquid condensate columns and generating increased negative pressure generation within the core which results in a vacuum that pulls in vaporous fluid more quickly. Generally, the cross-sectional profile of struts 230 and 232 allow cooling fluid 120 to separate around strut 230 or 232 (e.g., at a leading edge) and come back together downstream of strut 230 or 232 (e.g., at a trailing edge).

Furthermore, first strut 230 may also have different cross-sectional profile than second strut 232. Struts 230 and 232 may have any cross-sectional profile shape that is optimized for a particular use and facilitates operation of heat exchanger 100 as described herein. Moreover, in another embodiment, unit cells 224, 226, and 228 of microtruss tiers 216, 218, and 220 may have a different cross-sectional shape and/or cross-sectional area than units cells 224, 226, and 228 of different microtruss tiers 216, 218, and 220. Additionally, unit cells 224, 226, and 228 of microtruss tiers 216, 218, and 220 may be oriented in a different direction than units cells 224, 226, and 228 of different microtruss tiers 216, 218, and 220. For example, unit cells 228 of third tier 220 may be oriented in a different direction than unit cells 216 of first tier 224. Unit cells 228 of third tier 220 may be oriented to direct a concentrated flow of cooling fluid stream 120 to a particular area of heat exchanger 100 that receives a concentrated amount of heat.

In one implementation, as shown in FIG. 2, struts 230 and 232 define a particular intersection angle 248 at node 246. As shown in FIG. 2, struts 230 and 232 are substantially perpendicular such that intersection angle is substantially 90°. Alternatively, intersection angle 248 may be any angle that facilitates operation of heat exchanger as described herein. Intersection angle 248 at least partially defines an open area 250 between upper and lower portions of unit cells 222 of adjacent tiers 214. Generally, the closer intersection angle 248 is to 90°, the larger open areas 250 will be. A large open area 250 allows for a lower pressure drop and for larger foreign object debris entrained within cooling stream 120 to pass therethrough without becoming lodged and plugging microtruss 200. A larger open area 150 also limits the density of unit cells 222 that may be included in microtruss 200, which may reduce heat transfer, but, as described above, allows for a lower pressure drop. A smaller intersection angle 250 allows for an increased density of unit cells 222, which increases heat transfer, but also increases the pressure drop of cooling fluid stream 120. Intersection angle 250 is optimized to meet certain operating goals or limits of each heat exchanger operation.

As best shown in FIGS. 1-3, planes 204, 206, 208, 210, and 212 are aligned with one another such that nodes 246 of an upstream plane are aligned with nodes 246 of an adjacent downstream plane with respect to the direction of cooling fluid stream 120. As such, open areas 250 of each plane 202 are aligned to provide stream 120 with a relatively large, continuous flow path through microtruss 200. Aligned 2-fold microtruss 200 has a reduced pressure drop because the amount of pressure drop in heat exchanger 100 is proportional to the density of struts 230 and 232 encountered by stream 120 at each plane. Since unit cells 222 of each plane 202 align with the unit cells of an adjacent plane 202, stream 120 is able to flow more smoothly through microtruss 200.

However, because each unit cell 222 includes only two struts 230 and 232, microtruss structure 200 has fewer struts in cooling stream 120 than the 4-fold truss described above. As such, aligned microtruss 200 causes a reduced pressure drop while also having an increased overall heat transfer when compared to the 4-fold microtruss described above having struts of similar cross-sectional area, cell height, node to strut area ratios, and node angles. The alignment of planes 202 is optimized to be based on predetermined operating goals or limits of each heat exchanger 100.

Figure 5:
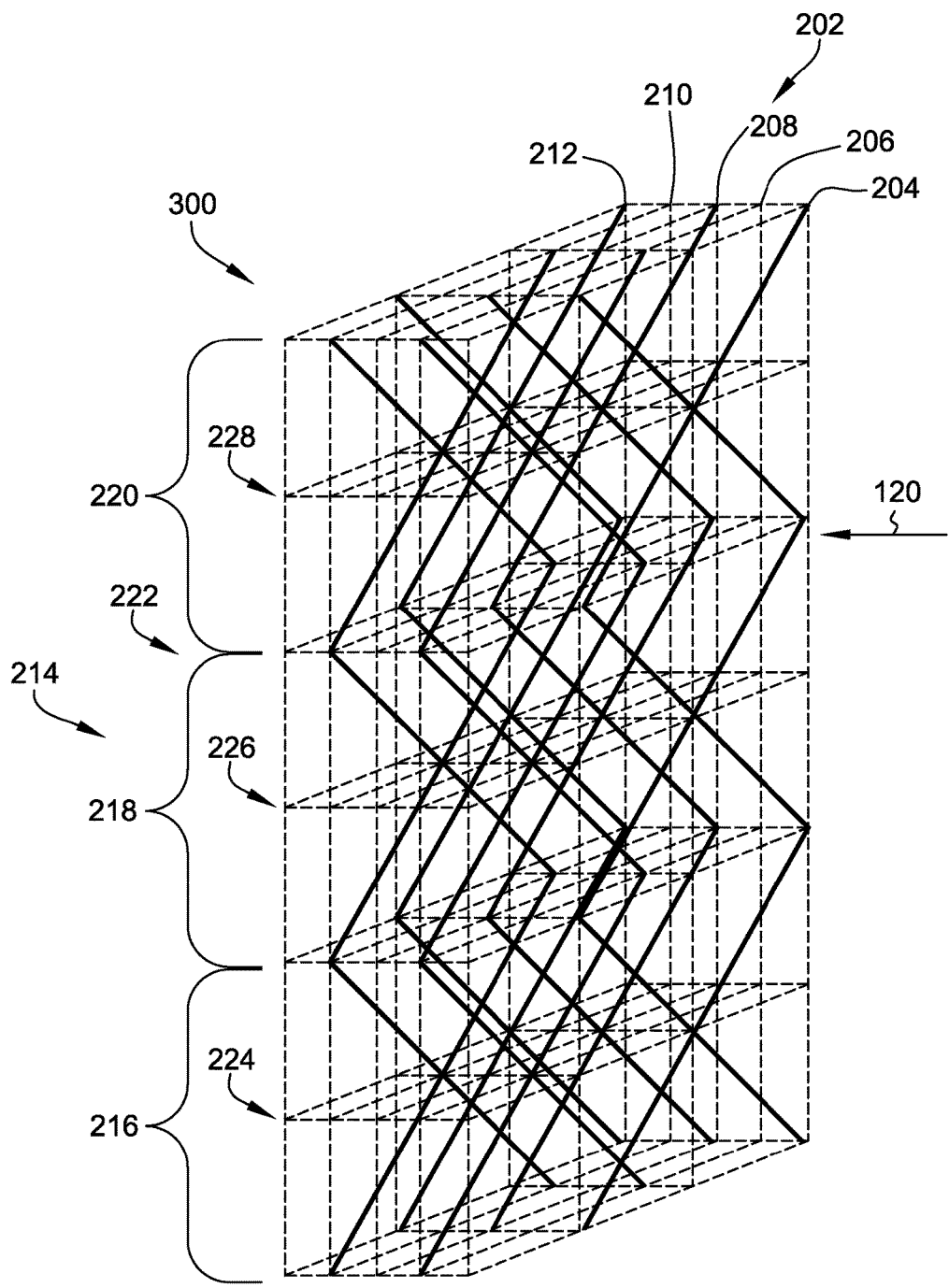
FIG. 5 is a perspective view of an alternative 2-fold microtruss structure having a plurality of offset planes.

FIG. 5 is a perspective view of an alternative 2-fold microtruss structure 300; FIG. 6 is a front view of microtruss 300; FIG. 7 is a top view of microtruss 300; and FIG. 8 is a side view of microtruss 300. In one implementation, microtruss 300 may be used on heat exchanger 100 as described above in lieu of microtruss 200 described above. Although described herein as used in cross flow heat exchanger 100, microtruss 300 may also be used in a surface heat exchanger. Furthermore, microtruss 300 is substantially similar to microtruss 200 (shown in FIGS. 1-4) in operation and composition, with the exception that planes 202 of microtruss 300 are horizontally offset from one another, whereas planes 202 of microtruss 200 are aligned, as described above. As such, components shown in FIGS. 5-8 are labeled with the same reference numbers as those used in FIGS. 1-4, where appropriate. Although microtruss 300 is shown and described as having planes 202 that are horizontally offset from an adjacent planes 202, it is contemplated that planes 202 of microtruss 300 may be vertically offset from adjacent planes 202 or both vertically and horizontally offset from adjacent planes 202.

As best shown in FIGS. 6 and 7, each of planes 202 is offset in a direction perpendicular to cooling fluid stream 120 by a predetermined offset distance 302. As such, nodes 246 of every other planes 202 align with each other, rather than nodes 246 of every planes, as is the case in microtruss 200. More specifically, with respect to FIG. 6, microtruss structure 300 in first plane 204 is shown in solid line and microtruss structure 300 in second plane 206 is shown in broken line to easily distinguish the two. As is shown, third unit cell 228 in third tier 220 of first plane 204 is offset by distance 302 from unit cell 228 in third tier 220 of second plane 206. In one embodiment, such a pattern continues to planes 208, 210, and 212, as shown in FIG. 7. Each unit cell 222 of microtruss 300 includes a length 304. Offset distance 302 is a portion of length 304 such that adjacent planes 202 at least partially overlap. For example, in FIGS. 5-8, planes 204, 208, and 212 are offset from planes 206 and 210 by an offset distance 302 equal to substantially half of unit cell length 304. In other implementations, offset distance 302 may be greater or less than one half of unit cell length 304, such as, but not limited to, three-quarters, one third, one quarter, or one fifth the length of unit cell length 304. Generally, a shorter offset distance 302 increases the density of microtruss 300 and provides for additional heat transfer while increasing the pressure drop through microtruss 300. Accordingly, the offset distance 302 should be selected based on predetermined operating goals or limits of each heat exchanger 100.

Offsetting of certain planes 202 from other planes 202 increases the surface area of downstream portions of microtruss 300 impinged upon by cooling fluid stream 120 and, as such, exposes additional struts 230 and 232 to cooling stream 120 that may not be exposed in the aligned configuration of microtruss 200. However, offsetting of planes 202 may also limit the flow of stream 120 through microtruss 300 to cause an increase in the pressure drop. More specifically, open areas 250 of microtruss 300 are greater in number, but generally smaller in size such that a smaller volume of stream 120 passes through each. Whether planes 202 are offset or not is based on a predetermined desired pressure drop and desired heat transfer rate of heat exchanger 100. Furthermore, heat exchanger 100 may include a microtruss structure that includes a combination of aligned and offset planes. Additionally, heat exchanger 100 may include a microtruss structure that includes planes that are woven or interlaced together.

Figure 9:
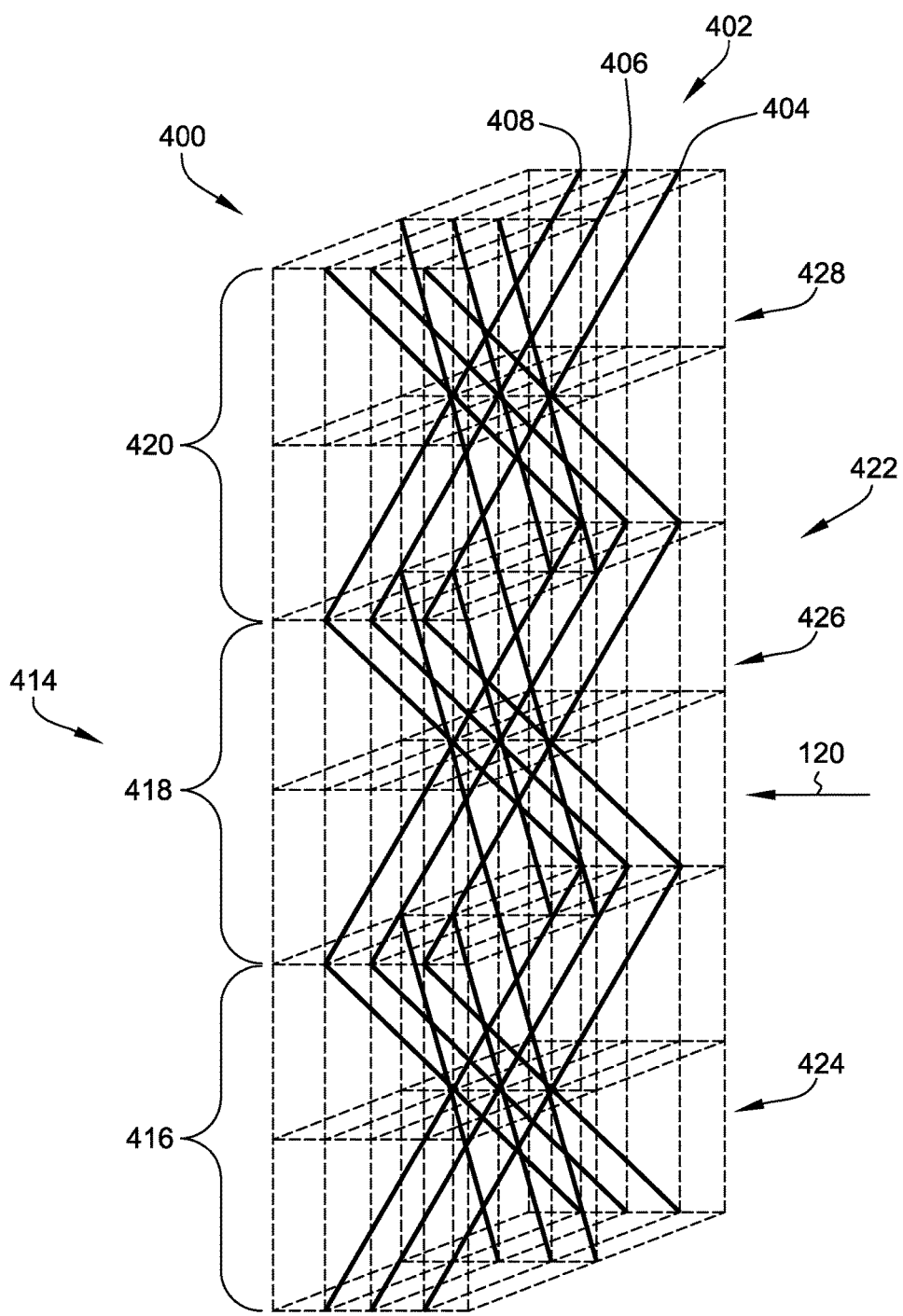
FIG. 9 is a perspective view of an exemplary 3-fold microtruss structure having a plurality of aligned planes.

FIG. 9 is a perspective view of an exemplary 3-fold microtruss structure 400 having a plurality of aligned planes 402. FIG. 10 is a front view of microtruss 400. FIG. 11 is a top view of microtruss 400. FIG. 12 is a side view of microtruss 400. In one implementation, microtruss 400 may be used on heat exchanger 100 (shown in FIG. 1) as described above in lieu of microtruss 200. Although described herein as used in cross flow heat exchanger 100, microtruss 400 may also be used in a surface heat exchanger. As shown in FIG. 9, microtruss 400 includes a plurality of planes 402 including a first plane 404, a second plane 406, and a third plane 408 that are vertically oriented and arranged sequentially in a direction of cooling fluid stream 120 such that stream 120 initially encounters first plane 404. Each plane 402 includes a plurality of tiers 414. Shown in FIG. 9 are first tier 416, second tier 418, and third tier 420. Although only three planes 402 and three tiers 414 are shown, it is contemplated that microtruss 400 may have any number of planes 402 and tiers 414 to facilitate operation of heat exchanger 100 as described herein.

In the exemplary implementation, planes 402 and tiers 414 of microtruss 400 include a plurality of identical ordered unit cells 422 that form repeating patterns within microtruss 400. More specifically, each tier 414 includes a height of a single unit cell 422 such that first tier 416 includes a plurality of first unit cells 424, second tier 418 includes a plurality of second unit cells 426, and third tier 420 includes a plurality of third unit cells 428.

As shown in FIGS. 9-12, microtruss 400 is a 3-fold microtruss structure, indicating that each unit cell 422 of microtruss 400 includes only three struts including a first strut 430, a second strut 432, and a third strut 433. Struts 430, 432, and 433 are substantially similar to struts 110 (shown in FIG. 1) in form and in operation and may also be referred to as "truss elements," "truss members," or "polymer waveguides". As best shown in FIG. 10, first strut 430 includes a first end 434, a second end 436, and a body 438 extending therebetween. Similarly, second strut 432 includes a first end 440, a second end 442, and a body 444 extending therebetween. Additionally, third strut 433 includes a first end 435, a second end 437 and a body 439 extending therebetween. In the exemplary implementation, body portions 438, 444, and 439 of each strut 430, 432, and 433 intersect each other at their respective midpoints to define a node 446. The node may be implemented using, for example, a 6-way cross pipe fitting. Alternatively, struts 430, 432, and 433 may intersect each other at any point along body portions 438, 444, and 439 that facilitates operation of heat exchanger 100 (shown in FIG. 1) as described herein. Each node 446 includes a cross-sectional area that is equal to the sum of the cross sectional areas of struts 430, 432, and 433 such that a pressure and velocity of hot fluid stream 114 (shown in FIG. 1) within struts 430, 432, and 433 remains substantially constant within interior 116 (shown in FIG. 1) of heat exchanger 100.

Struts 430, 432, and 433 are shaped substantially similarly, and, as best shown in FIG. 11, include a substantially elliptical cross-sectional profile having a major axis aligned in the direction of cooling fluid stream 120. An elliptical cross-sectional profile aligned as such provides an increased amount of heat transfer along the sides of struts 430, 432, and 433 while presenting only a small profile, equal to a length of a minor axis, to cooling fluid stream 120 to minimize a pressure drop caused by impingement of cooling fluid stream 120 on struts 430, 432, and 433. In one embodiment, the major axis of each strut 430, 432, and 433 is within a range of between approximately 1 millimeter (mm) (0.039 inches (in.)) and approximately 4 mm (0.157 in.) and the minor axis is within a range of between approximately 0.25 mm (0.009 in.) and approximately 1 mm (0.039 in.). Alternatively, the major and minor axes of struts 430, 432, and 433 may be any length that facilitates operation of heat exchanger 100 as described herein. Similarly, a ratio of the length of the major axis compared to the minor axis is one of 4-1 or 5-1. Alternatively, the length ratio of the major and minor axes of struts 430, 432, and 433 may be any ratio that facilitates operation of heat exchanger 100 as described herein.

In other embodiments, the cross-sectional profile of each strut 430, 432, and 433 is shaped as one of a teardrop, airfoil, or circle. Generally, the cross-sectional profile of struts 430, 432, and 433 allow cooling fluid 120 to separate around struts 430, 432, and 433 (e.g., at a leading edge) and come back together downstream of struts 430, 432, and 433 (e.g., at a trailing edge). Furthermore, third strut 433 may have different cross-sectional profile than first strut 430 and second strut 432. Struts 430, 432, and 433 may have any cross-sectional profile shape that is optimized for a particular use and facilitates operation of heat exchanger 100 as described herein.

In one implementation, as shown in FIG. 10, struts 430 and 432 define a first intersection angle 448 at node 446 between struts 430 and 432. Struts 430 and 432 are substantially perpendicular such that intersection angle 448 is substantially 90°. Alternatively, intersection angle 448 may be any angle that facilitates operation of heat exchanger as described herein.

Furthermore, third strut 433 substantially bisects first intersection angle 448, as shown in FIG. 10, and forms a second intersection angle 450 between third strut 433 and first strut 430 and a third intersection angle 452 between third strut 433 and second strut 432, where intersection angles 450 and 452 are substantially similar, as shown in FIG. 12. In the exemplary implementation of microtruss 400, third strut 433 intersects first and second struts 430 and 432 at intersection angles 450 and 452, respectively, such that first ends 434, 440, and 435 form an isosceles triangle 456, shown in broken lines in FIG. 11. As such, in the exemplary implementation of microtruss 400, third strut 433 intersects first and second struts 430 and 432 at intersection angles 450 and 452, respectively, of less than 45°. Alternatively, third strut 433 may intersect struts 430 and 432 at any intersection angle that facilitates operation of heat exchanger 100 as described herein.

Intersection angle 448 at least partially defines an open area 460 between upper and lower portions of unit cells 422 of adjacent tiers 414. Generally, the closer intersection angle 448 is to 90°, the larger open areas 460 will be. A large open area 460 allows for a lower pressure drop and for larger foreign object debris entrained within cooling stream 120 to pass therethrough without becoming lodged and plugging microtruss 400. A larger open area 460 also limits the density of unit cells 422 that may be included in microtruss 400, which may reduce heat transfer, but, as described above, allows for a lower pressure drop. A smaller intersection angle 460 allows for an increased density of unit cells 422, which increases heat transfer, but also increases the pressure drop of cooling fluid stream 120. Intersection angle 460 is optimized to meet certain operating goals or limits of each heat exchanger operation.

As best shown in FIGS. 9-11, planes 404, 406, and 408 are aligned with one another such that nodes 446 of an upstream plane are aligned with nodes 446 of an adjacent downstream plane with respect to the direction of cooling fluid stream 120. As such, open areas 460 of each plane 402 are aligned to provide stream 120 with a relatively large, continuous flow path through microtruss 400. Aligned 3-fold microtruss 400 has a reduced pressure drop because the amount of pressure drop in heat exchanger 100 is proportional to the density of struts 430, 432, and 433 encountered by stream 120 at each plane. Since unit cells 422 of each plane 402 align with the unit cells of an adjacent plane 402, stream 120 is able to flow more smoothly through microtruss 400. However, because stream 120 may not directly impinge upon each unit cell 422, the overall heat transfer of microtruss 400 may be reduced. As such, the alignment of planes 402 is optimized to be based on predetermined operating goals or limits of each heat exchanger 100.

Figure 13:
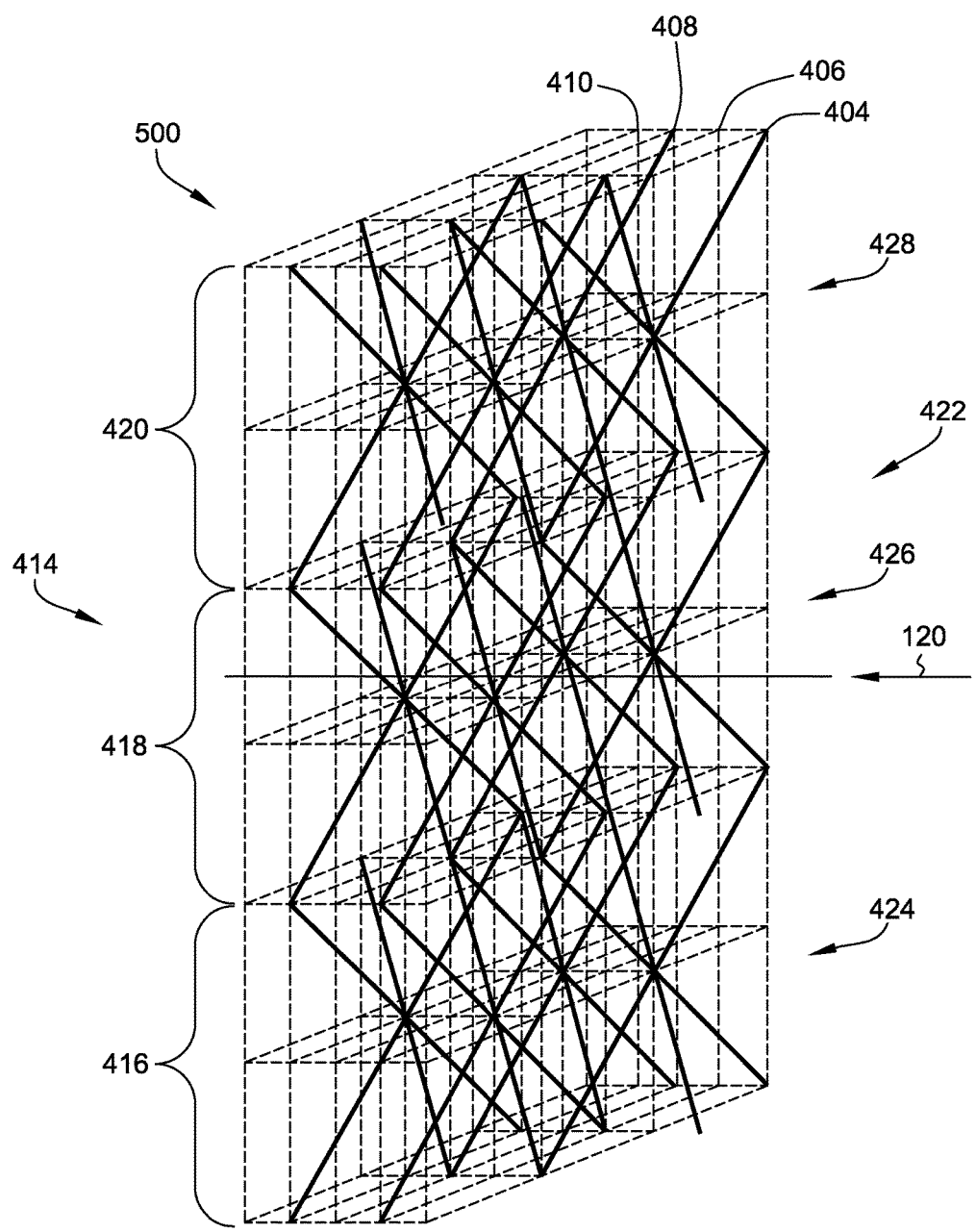
FIG. 13 is a perspective view of an alternative 3-fold microtruss structure having a plurality of offset planes.
Figure 15:
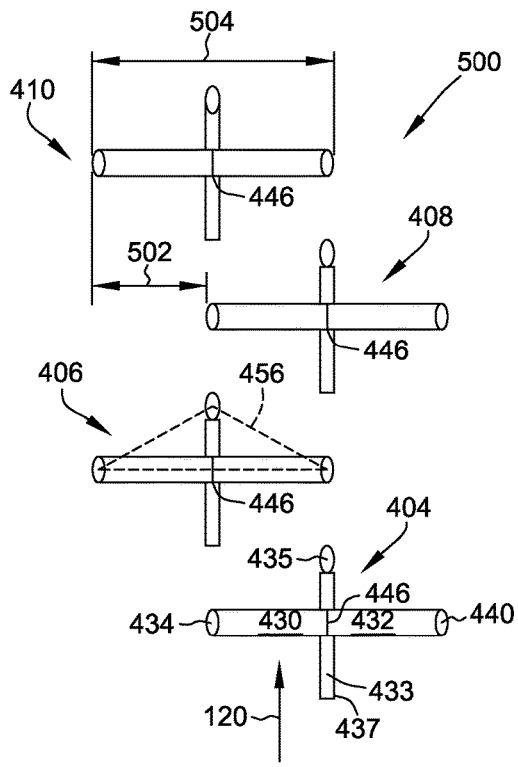
FIG. 15 is a top view of the microtruss structure shown in FIG. 13.
Figure 16:
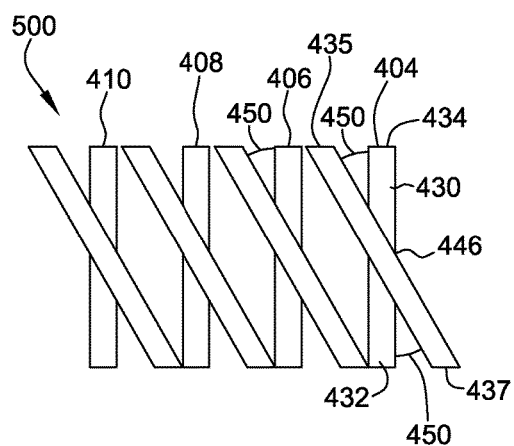
FIG. 16 is a side view of the microtruss structure shown in FIG. 13.
Figure 14:
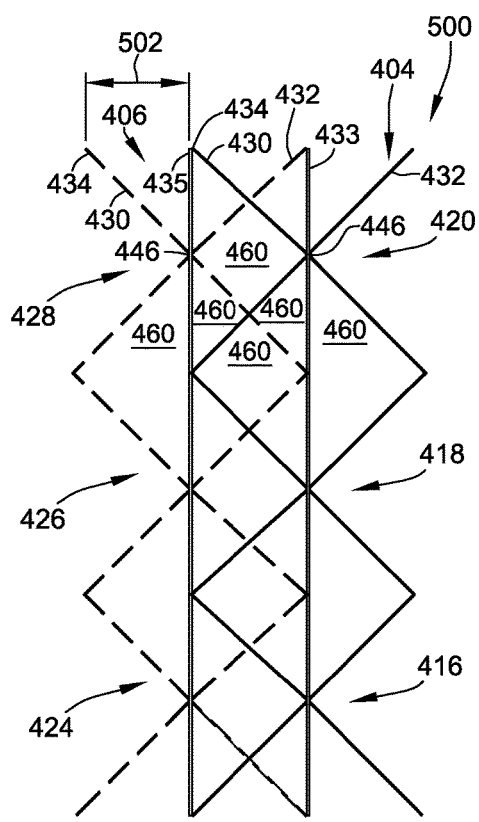
FIG. 14 is a front view of the microtruss structure shown in FIG. 13.

FIG. 13 is a perspective view of an alternative 3-fold microtruss structure 500; FIG. 14 is a front view of microtruss 500. FIG. 15 is a top view of microtruss 500. FIG. 16 is a side view of microtruss 500. In one implementation, microtruss 500 may be used on heat exchanger 100 (shown in FIG. 1) in lieu of microtruss 200. Although described herein as used in cross flow heat exchanger 100, microtruss 500 may also be used in a surface heat exchanger. Furthermore, microtruss 500 is substantially similar to microtruss 400 (shown in FIGS. 9-12) in operation and composition, with the exception that planes 402 of microtruss 500 are offset from one another, whereas planes 402 of microtruss 400 are aligned, as described above. As such, components shown in FIGS. 13-16 are labeled with the same reference numbers as those used in FIGS. 9-12, where appropriate. Although microtruss 500 is shown and described as having planes 402 that are horizontally offset from an adjacent planes 402, it is contemplated that planes 402 of microtruss 500 may be vertically offset from adjacent planes 402 or both vertically and horizontally offset from adjacent planes 402.

As best shown in FIGS. 14 and 15, each of planes 402 is offset in a direction perpendicular to cooling fluid stream 120 by a predetermined offset distance 502. As such, nodes 446 of every other planes 402 align with each other, rather than nodes 446 of every planes, as is the case in microtruss 400. More specifically, with respect to FIG. 14, microtruss structure in first plane 404 is shown in solid line and microtruss structure in second plane 406 is shown in broken line to easily distinguish the two. As is shown, third unit cell 428 in third layer 420 of first plane 404 is offset by distance 502 from unit cell 428 in third layer 420 of second plane 406. In one embodiment, such a pattern continues for planes 408 and 410, as shown in FIG. 15. Each unit cell 422 of microtruss 500 includes a length 504. Offset distance 502 is a portion of length 504 such that adjacent planes 402 at least partially overlap. For example, in FIGS. 13-16, planes 404 and 408 are offset from planes 406 and 410 by an offset distance 502 equal to substantially half of unit cell length 504. In other implementations, offset distance 502 may be greater or less than one half of unit cell length 504, such as, but not limited to, three-quarters, one third, one quarter, or one fifth the length of unit cell length 504.

Offsetting of certain planes 402 from other planes 402 increases the surface area of downstream portions of microtruss 500 impinged upon by cooling fluid stream 120 and, as such, exposes additional struts 430, 432, and 433 to cooling stream 120 that may not be exposed in the aligned configuration of microtruss 400. However, offsetting of planes 402 may also limit the flow of stream 120 through microtruss 500 to cause an increase in the pressure drop. More specifically, open areas 460 of microtruss 500 are greater in number, but generally smaller in size such that a smaller volume of stream 120 passes through each. Whether planes 402 are offset or not is based on a predetermined desired pressure drop and desired heat transfer rate of heat exchanger 100. Furthermore, heat exchanger 100 may include a microtruss structure that includes a combination of aligned and offset planes. Additionally, heat exchanger 100 may include a microtruss structure that includes planes that are woven or interlaced together.

Implementations of a heat exchanger, such as heat exchanger 100 (shown in FIG. 1), described herein include a manifold, such as manifold 102 (shown in FIG. 1), having a first skin layer and a second skin layer, such as first and second skin layers 104 and 106 (shown in FIG. 1). The skin layers are positioned a predetermined distance apart to define an interior, such as interior 116 (shown in FIG. 1), therebetween.

The heat exchangers described herein also include at least one microtruss structure, such as any of microtruss structures 200, 300, 400, and 500 (shown in FIGS. 1-16). Each microtruss structure includes a first plane, such as planes 204 and 404 (shown in FIGS. 1-16) comprising a first plurality of unit cells, such as unit cells 224 and 424 (shown in FIGS. 1-16). Each of the first plurality of unit cells includes a first plurality of struts, such as 230 and 232, or 430, 432, and 433 (shown in FIGS. 1-16) and a first node, such as nodes 246 and 446 (shown in FIGS. 1-16) connecting three or fewer struts of the first plurality of struts such that each strut of the first plurality of struts extends through the first node.

Each microtruss structure also includes a second plane, such as planes 206 and 406 (shown in FIGS. 1-16) comprising a second plurality of unit cells, such as unit cells 226 and 426 (shown in FIGS. 1-16). Each of the second plurality of unit cells includes a second plurality of struts, such as 230 and 232, or 430, 432, and 433 (shown in FIGS. 1-16) and a second node, such as nodes 246 and 446 (shown in FIGS. 1-16) connecting three or fewer struts of the second plurality of struts such that wherein each strut of the second plurality of struts extends through the second node.

In one embodiment, each of the first and second pluralities of struts include two struts that intersect each other at a respective node of the first and second nodes. In another embodiment, each of the first and second plurality of struts include three struts that intersect each other at a respective node of the first and second nodes. Moreover, in one embodiment, the first node of the first plane is aligned with the second node of the adjacent second plane. Alternatively, the first node of the first plane is offset by a predetermined distance from the second node of the adjacent second plane. In the exemplary implementation, a center of each strut of the first and second pluralities of struts is positioned at a respective node of the first and second nodes, and each strut of the first and second pluralities of struts is substantially hollow and defines a substantially elliptical cross-sectional shape. Furthermore, in embodiments where the first and second pluralities of struts include three struts, the ends of the first, second, and third struts combine to form an isosceles triangle.

The first and second skin layers of the manifold, as described above, include a plurality of openings configured to enable a first fluid stream, such as hot fluid stream 114 (shown in FIG. 1), to flow through the interior portion of the manifold. In one embodiment, each strut is aligned with a respective opening of the plurality of openings in the skin layers such that the first fluid stream flows through the hollow microtruss structure. Furthermore, a second fluid stream, such as cooling fluid stream 120 (shown in FIG. 1), impinges upon the microtruss structure to facilitate heat transfer therebetween, wherein the first fluid stream is oriented substantially perpendicular to the second fluid stream.

Figure 17:
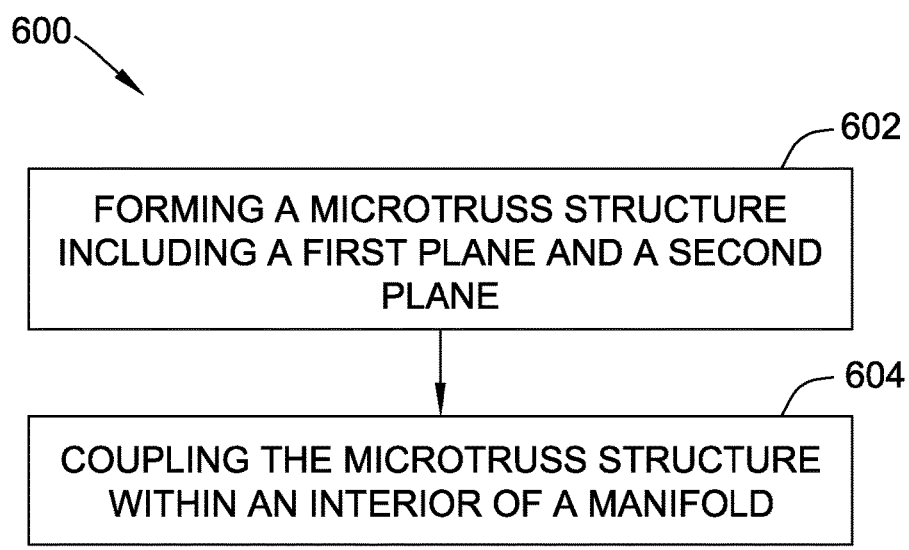
FIG. 17 is a flow chart illustrating an exemplary method of manufacturing the heat exchanger shown in FIG. 1.

FIG. 17 is a flow chart illustrating an exemplary method 600 of manufacturing heat exchanger 100 (shown in FIG. 1). Method 600 includes forming 602 a microtruss structure, such as any of microtruss structures 200, 300, 400, and 500 (shown in FIGS. 1-16). As described above, each of microtruss structures 200, 300, 400, and 500 includes a first plane, such as planes 204 and 404 (shown in FIGS. 1-16) comprising a first plurality of unit cells, such as unit cells 224 and 424 (shown in FIGS. 1-16). Each of the first plurality of unit cells includes a first plurality of struts, such as 230 and 232, or 430, 432, and 433 (shown in FIGS. 1-16) and a first node, such as nodes 246 and 446 (shown in FIGS. 1-16) connecting three or fewer struts of the first plurality of struts such that wherein each strut of the first plurality of struts extends through the first node.

Each of microtruss structures 200, 300, 400, and 500 also includes a second plane, such as planes 206 and 406 (shown in FIGS. 1-16) comprising a second plurality of unit cells, such as unit cells 226 and 426 (shown in FIGS. 1-16). Each of the second plurality of unit cells includes a second plurality of struts, such as 230 and 232, or 430, 432, and 433 (shown in FIGS. 1-16) and a second node, such as nodes 246 and 446 (shown in FIGS. 1-16) connecting three or fewer struts of the second plurality of struts such that wherein each strut of the second plurality of struts extends through the second node.

Method 600 also includes coupling 604 the microtruss structure within an interior, such as interior 116 (shown in FIG. 1), of a manifold, such as manifold 102 (shown in FIG. 1), between a first skin layer and a second skin layer, such as first and second skin layer 104 and 106 (shown in FIG. 1). As described above, forming 602 the microtruss structure includes forming the microtruss structure using at least one of additive manufacturing, direct metal laser sintering, and metallic plating. Furthermore, as described above, forming 602 the microtruss structure includes forming the microtruss structure from at least one of a polymer, a metal, a metal alloy, and a ceramic material.

Figure 18:
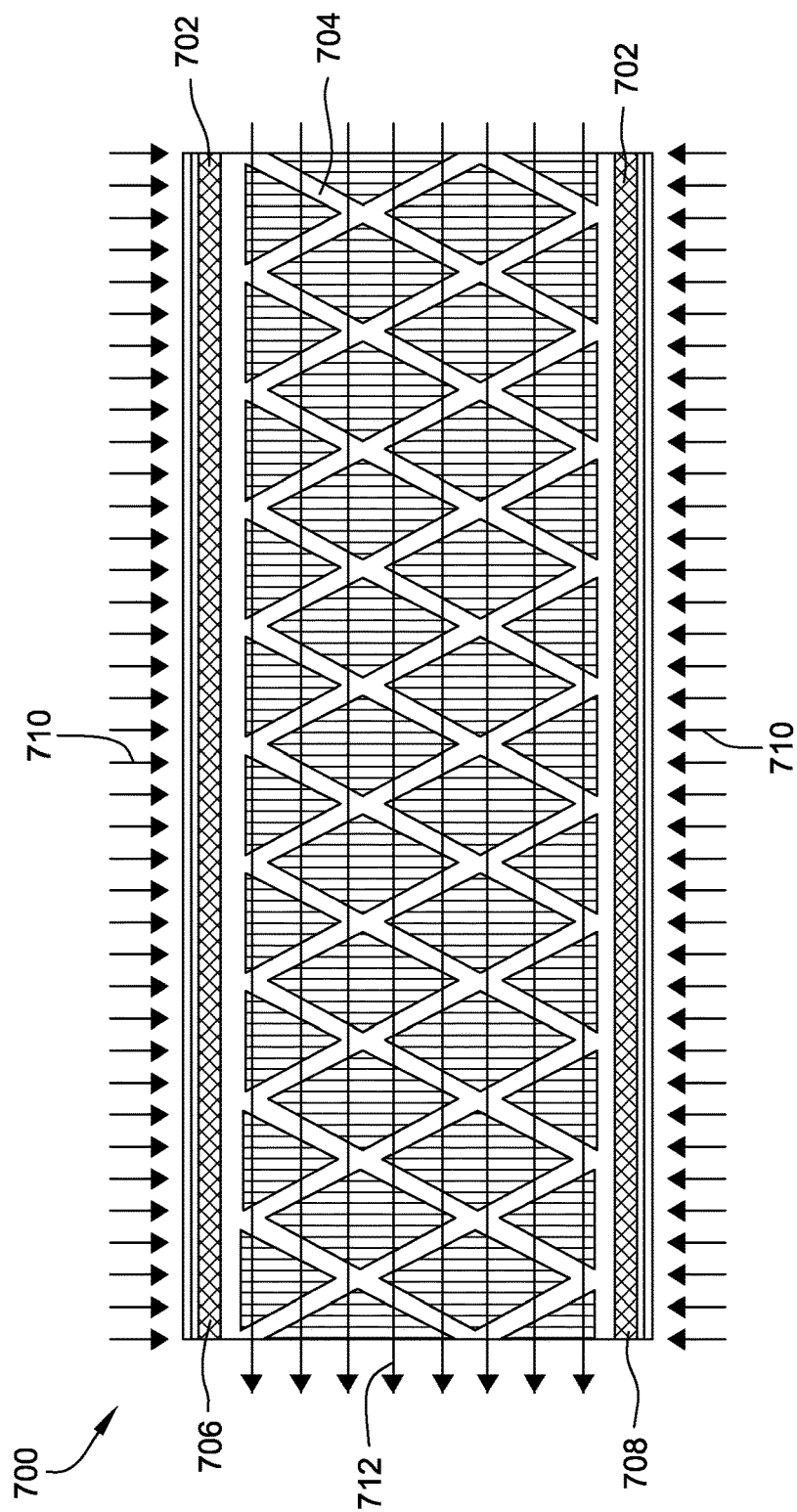
FIG. 18 is an exemplary heat pipe heat exchanger that may use any of the microtruss structure shown in FIGS. 1, 5, 9, and 13.

FIG. 18, illustrates a cross-sectional view of an exemplary heat pipe 700. In one embodiment, heat pipe 700 includes a wick structure 702 that substantially encases a hollow microtruss structure 704 such that microtruss structure 704 is covered on all sides by wick structure 702. Alternatively, wick structure 702 is preferably coupled to four sides of heat pipe 700 such that wick structure 702 forms a hollow box around microtruss 704 with two opposing open ends. Generally, wick structure 702 may be coupled to any number of the sides of heat pipe 700. Alternatively, heat pipe 700 may be any shape, as opposed to a box shape, as is shown in FIG. 18. More specifically, heat pipe 700 may be substantially cylindrical. Furthermore, heat pipe 700 includes a first cross-sectional profile at a first end (not shown) and a second cross-sectional profile at a second end (not shown). In one embodiment, the first cross-sectional profile is substantially similar to the second cross-sectional profile, and in another embodiment, the first cross-sectional profile is different from the second cross-sectional profile.

A heat pipe is a two-phase heat transfer device that utilizes evaporation and condensation of a working fluid to transfer heat, and the capillary forces developed in fine porous wicks to circulate the fluid. More specifically, a heat pipe is a closed environment containing a fluid which constantly undergoes an evaporative/condensation cycle. A continuous wick transfers the condensed fluid from the cold portion or condenser to the hot portion or evaporator where the fluid returns to the vapor state. The vapor then moves through the closed environment in that portion not occupied by the wick back to the condenser where it returns to the fluid state.

Microtruss 704 may be any of microtruss 200, 300, 400, or 500 described above. As shown in FIG. 18, a top layer 706 and a bottom layer 708 are exposed to a heat flux 710. Layers 706 and 708 include a liquid refrigerant such that heat flux applied to layers 706 and 708 results in evaporation of the refrigerant into hollow microtruss 704. A cooling flow 712 flows through microtruss 704 and absorbs heat from the refrigerant and causes it to condense. In one implementation, cooling flow 712 flows within hollow struts of microtruss 704. In another implementation, cooling flow 712 flows through open areas defined between the struts of microtruss 704. In yet another implementation, cooling flow 712 flows both through the struts of microtruss 704 and in the open areas defined between the struts. As cooling flow 712 absorbs heat, the refrigerant condenses and flows through the struts of microtruss 704 to at least one of layers 706 and/or 708 of wick structure 702. Capillary action in wick structure 702 then guides the liquid refrigerant to an area of concentrated heat flux 710 to begin the cycle again.

In one application, the described implementations may be utilized as part of a thermal protection system for an aircraft. The described implementations are directed to a heat exchanger that uses a microtruss structure to transfer heat between two fluid streams. The microtruss structure may be have 2-fold (two struts intersect at a node) or 3-fold (three struts intersect at a node) architecture that allows more of a first fluid flow to interact with downstream struts, as compared to 4+-fold architectures. Further, the heat exchanger having any of the microtruss structures described herein may be retrofitted into an existing product in replacement of less efficient structure or may be implemented during initial design of a new product. Microtruss structures have 2-fold and 3-fold offset and aligned architectures have superior heat transfer characteristics when compared to variations of 4-fold architecture because 2-fold and 3-fold architectures include additional spacing between nodes, which reduces the blockage of a cooling fluid stream over downstream struts. As such, 2-fold and 3-fold truss designs have more strut surface areas exposed to the cooling fluid stream. Accordingly, heat exchangers utilizing 2-fold & 3-fold aligned and offset truss structures, in lieu of 4-fold truss structures can yield superior heat transfer, lower operating temperatures, and better reliabilities. In lieu of plate/fin architectures, the truss-based designs can mitigate these losses due to their superior tolerance to foreign object debris, and, for the same reason, they can reduce maintenance costs. Their lighter weights can reduce support structures and associated costs. Moreover, in aircraft, the lighter weights of 2-fold & 3-fold aligned and offset truss structures translate to improved specific fuel consumption.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A microtruss structure for use in a heat exchanger, said microtruss comprising:
    a first plane comprising a first plurality of unit cells, wherein each of said first plurality of unit cells comprises a first plurality of struts and a first node connecting three or fewer struts of the first plurality of struts, wherein each strut of the first plurality of struts extends through said first node, wherein said first plurality of struts is hollow to enable a first portion of a first fluid flow therethrough; and
    a second plane comprising a second plurality of unit cells oriented parallel to said first plurality of units cells such that a constant width gap is defined therebetween, wherein each of said second plurality of unit cells comprises a second plurality of struts and a second node connecting three or fewer struts of the second plurality of struts, wherein each strut of the second plurality of struts extends through said second node, wherein said second plurality of struts is hollow to enable a second portion of a first fluid flow therethrough, wherein said first plurality of struts is physically spaced from said second plurality of struts such that the first portion of the first fluid flow is not in fluid communication with the second portion of the first fluid flow.

2. The microtruss structure in accordance with claim 1, wherein each of said first and said second pluralities of struts include at least two struts that intersect each other at a respective node of said first and said second nodes.

3. The microtruss structure in accordance with claim 1, wherein each of said first and said second plurality of struts include three struts that intersect each other at a respective node of said first and said second nodes.

4. The microtruss structure in accordance with claim 3, wherein said first plurality of struts includes a first strut having a first end, a second strut having a second end, and a third strut having a third end, wherein said first, said second, and said third ends combine to form an isosceles triangle.

5. The microtruss structure in accordance with claim 1, wherein each strut of said first and said second pluralities of struts includes a substantially elliptical cross-sectional shape.

6. The microtruss structure in accordance with claim 1, wherein said first plane is positioned adjacent said second plane, and wherein said first node is aligned with said second node.

7. The microtruss structure in accordance with claim 1, wherein said first plane is positioned adjacent said second plane, and wherein said first node is offset from said second node by a predetermined distance.

8. The microtruss structure in accordance with claim 1, wherein a center of each strut of said first and said second pluralities of struts is positioned at a respective node of said first and said second nodes.

9. A heat exchanger comprising:
a manifold comprising a first skin layer and a second skin layer positioned a predetermined distance from said first skin layer such that an interior portion is defined therebetween; and
a microtruss structure extending within said interior portion and coupled to said first and said second skin layers, said microtruss structure comprising:
a first plane comprising a first plurality of unit cells, wherein each of said first plurality of unit cells comprises a first plurality of struts and a first node connecting three or fewer struts of the first plurality of struts, wherein each strut of the first plurality of struts extends through said first node, wherein said first plurality of struts is hollow to enable a first portion of a first fluid flow therethrough; and
a second plane comprising a second plurality of unit cells, wherein each of said second plurality of unit cells comprises a second plurality of struts and a second node connecting three or fewer struts of the second plurality of struts, wherein each strut of the second plurality of struts extends through said second node, wherein said second plurality of struts is hollow to enable a second portion of a first fluid flow therethrough, wherein said first plurality of struts is physically spaced from said second plurality of struts such that the first portion of the first fluid flow is not in flow communication with the second portion of the first fluid flow.

10. A heat exchanger in accordance with claim 9, wherein each of said first and said second skin layers include a plurality of openings configured to enable said first fluid flow to flow through said interior portion.

11. A heat exchanger in accordance with claim 10, wherein each strut of said first and said second pluralities of struts is aligned with a respective opening of said plurality of openings.

12. A heat exchanger in accordance with claim 11, wherein a second fluid stream impinges upon said microtruss structure to facilitate heat transfer therebetween, said first fluid stream oriented substantially perpendicular to said second fluid stream.

13. A heat exchanger in accordance with claim 9, wherein each of said first and said second pluralities of struts include at least two struts that intersect each other at a respective node of said first and said second nodes.

14. A heat exchanger in accordance with claim 9, wherein each of said first and said second plurality of struts include three struts that intersect each other at a respective node of said first and said second nodes.

15. A heat exchanger in accordance with claim 9, wherein said first plane is positioned adjacent said second plane, and wherein said first node is aligned with said second node.

16. A heat exchanger in accordance with claim 9, wherein said first plane is positioned adjacent said second plane, and wherein said first node is offset from said second node by a predetermined distance.

17. A method of manufacturing a heat exchanger, said method comprising:
forming a microtruss structure including:
a first plane comprising a first plurality of unit cells, wherein each of said first plurality of unit cells comprises a first plurality of struts and a first node connecting three or fewer struts of the first plurality of struts, wherein each strut of the first plurality of struts extends through said first node, wherein the first plurality of struts is hollow to enable a first portion of a first fluid flow therethrough; and
a second plane comprising a second plurality of unit cells, wherein each of said second plurality of unit cells comprises a second plurality of struts and a second node connecting three or fewer struts of the second plurality of struts, wherein each strut of the second plurality of struts extends through said second node, wherein the second plurality of struts is hollow to enable a second portion of a first fluid flow therethrough, wherein the first plurality of struts is physically spaced from said second plurality of struts such that the first portion of the first fluid flow is not in fluid communication with the second portion of the first fluid flow;
positioning the microtruss structure within an interior portion of a manifold, wherein the inner portion is defined between a first skin layer and a second skin layer, and wherein positioning the microtruss structure comprises coupling the microtruss structure to the first skin layer and the second skin layer.

18. The method in accordance with claim 17, wherein forming a microtruss structure comprises forming a microtruss structure using at least one of additive manufacturing, direct metal laser sintering, and metallic plating.

19. The method in accordance with claim 17, wherein forming a microtruss structure comprises forming a microtruss structure from at least one of a polymer, a metal, a metal alloy, and a ceramic material.

20. The microtruss structure in accordance with claim 1, wherein said first plane is not in fluid communication with said second plane.

21. A microtruss structure for use in a heat exchanger, said microtruss comprising:
a first plane comprising a first plurality of unit cells, wherein each of said first plurality of unit cells comprises a first plurality of struts and a first node connecting three struts of the first plurality of struts, wherein each strut of the first plurality of struts extends through said first node, wherein said first plurality of struts is hollow to enable a first portion of a first fluid flow therethrough; and
a second plane comprising a second plurality of unit cells oriented parallel to said first plurality of units cells such that a constant width gap is defined therebetween, wherein each of said second plurality of unit cells comprises a second plurality of struts and a second node connecting three struts of the second plurality of struts, wherein each strut of the second plurality of struts extends through said second node, wherein said second plurality of struts is hollow to enable a second portion of a first fluid flow therethrough, wherein said first plurality of struts is physically spaced from said second plurality of struts such that the first portion of the first fluid flow is not in fluid communication with the second portion of the first fluid flow, wherein each of said first and said second plurality of struts include three struts that intersect each other at a respective node of said first and said second nodes.

* * * * *